Figure 1:
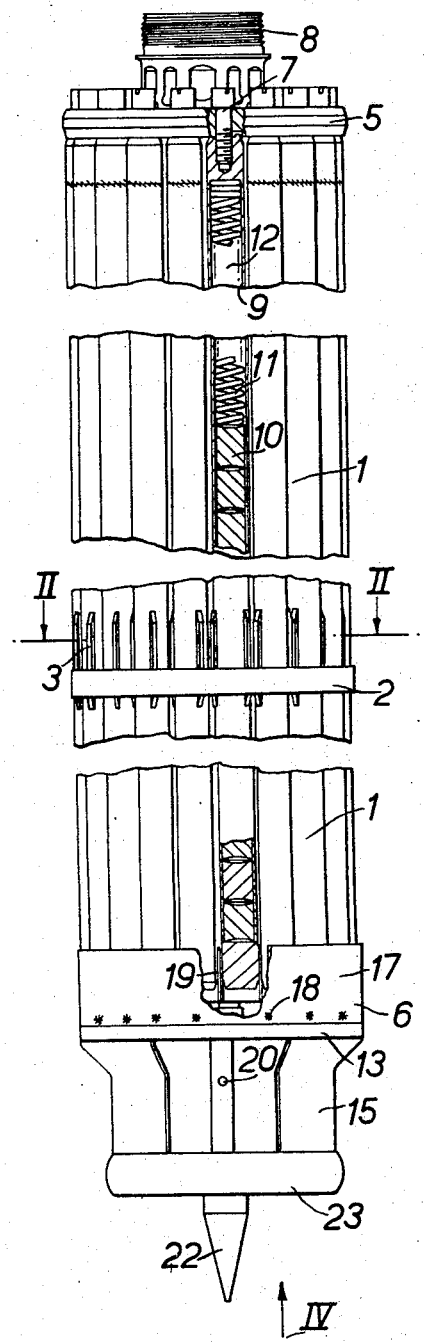

Sept. 26, 1967   R. J. HASLAM ETAL   3,344,036
NUCLEAR REACTOR FUEL ELEMENT ASSEMBLIES
Filed Sept. 28, 1965   5 Sheets-Sheet 4

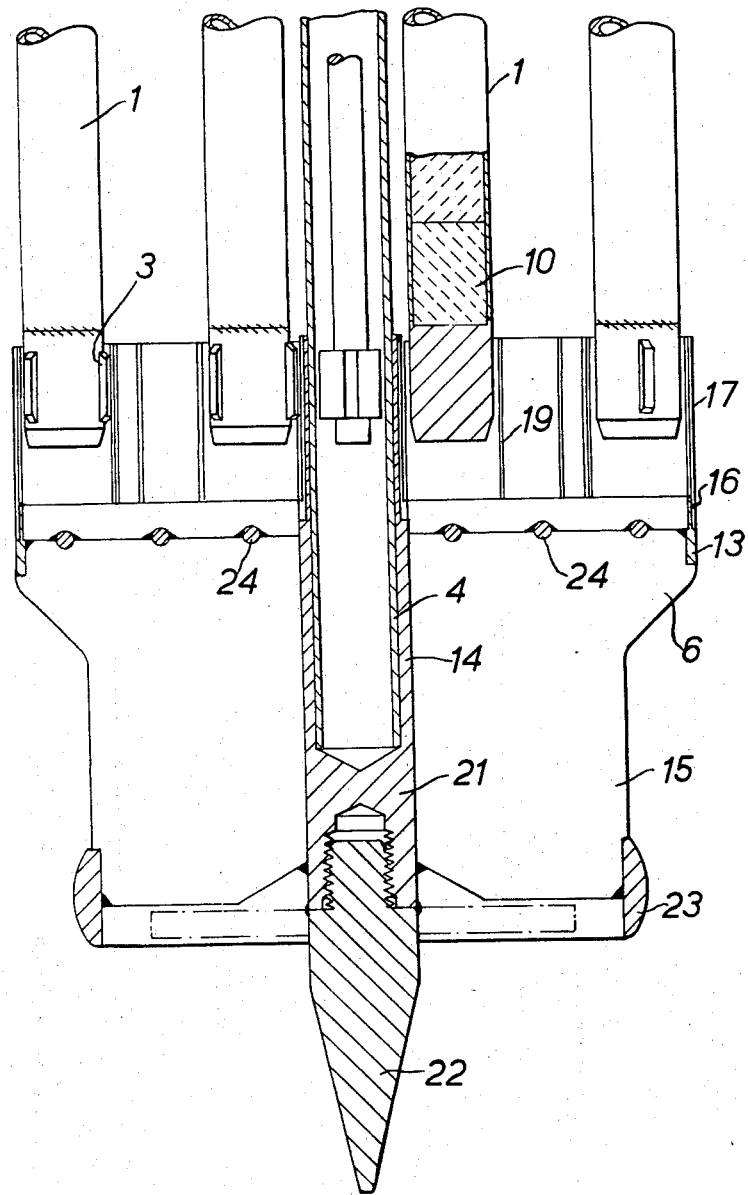

United States Patent Office 3,344,036
Patented Sept. 26, 1967

3,344,036
NUCLEAR REACTOR FUEL ELEMENT
ASSEMBLIES
Robert James Haslam, Urmston, Manchester, and Bernard Leaver, Atherton, Manchester, England, assignors to United Kingdom Atomic Energy Authority, London, England
Filed Sept. 28, 1965, Ser. No. 490,816
Claims priority, application Great Britain, Sept. 29, 1964, 39,524/64
3 Claims. (Cl. 176—78)

This invention relates to nucelar reactor fuel element assemblies of the kind comprising a cluster of end supported, spaced, parallel and sheathed fuel rods. Such a fuel element assembly is hereinafter termed a rod cluster fuel assembly.

In rod cluster fuel assemblies it is common to provide means for bracing the fuel rods against bowing into contact with one another and thereby to prevent damage to the rods due to inefficient heat transfer and hot spots at the points of contact. In one known construction of rod cluster fuel assembly the fuel rods are braced by helical wrappings of wire about individual fuel rods which serve to space the fuel rods. In another construction of rod cluster fuel assembly the fuel rods are braced by one or more transverse bracing grids each of which defines a first group of cells (each cell for penetration by a single fuel rod) and a second group of cells through which coolant is enabled to flow through the grid. However, because of differential thermal expansion and vibrations induced by flow of coolant over the fuel rods, there is a risk of fretting (i.e. surface damage) occurring to the sheath due to relative movement between the surfaces of the sheath and its wire wrap, or the sheath and the wire wrap of an adjacent rod, or between the surfaces of the sheath and the grid. Fretting can cause subsequent failure of the sheath when in use in a nuclear reactor core.

It is an object of the invention to reduce the occurrence of fretting of the sheaths in a rod cluster fuel assembly having means for bracing the rods against bowing.

According to the invention, in a rod cluster fuel assembly the fuel rods are braced intermediate the ends of the cluster by at least one transverse bracing grid and the assembly is characterised in that each fuel rod has a group of spaced solid projections on its outer surface, the group of projections coinciding with the transverse bracing grid and arranged so that the projections serve to space the fuel rods from the grid.

The projections provide wear pads so that fretting due to relative movement of the grid and rod surfaces occurs on the wear pad surfaces and not on the rod surfaces.

Preferably the projections are secured to the sheath by brazing, electron beam welding or by fusion welding means.

Alternatively, the projections can be formed integrally of the sheath.

Figure 2:
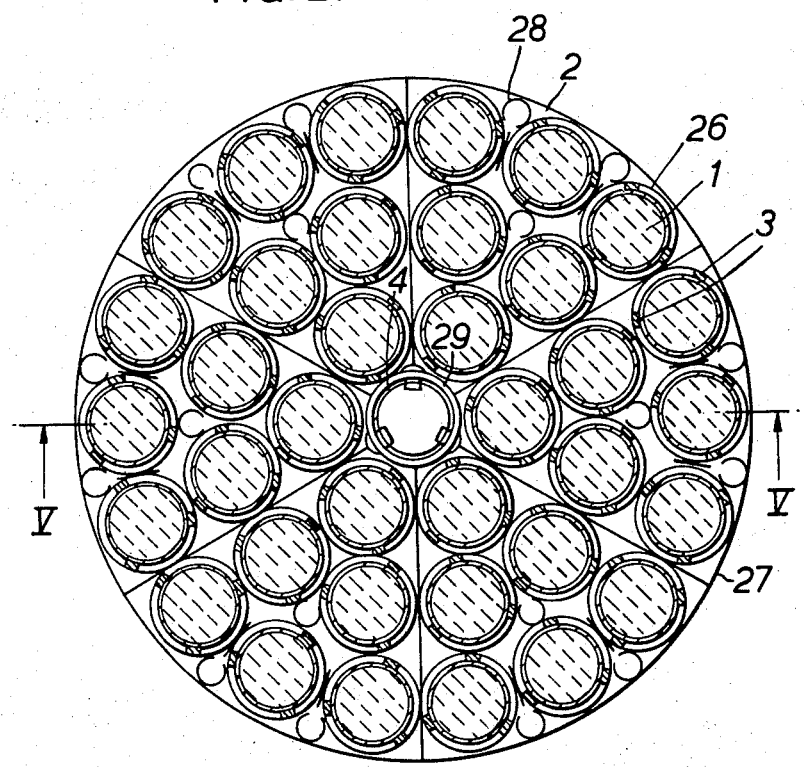
Figure 3:
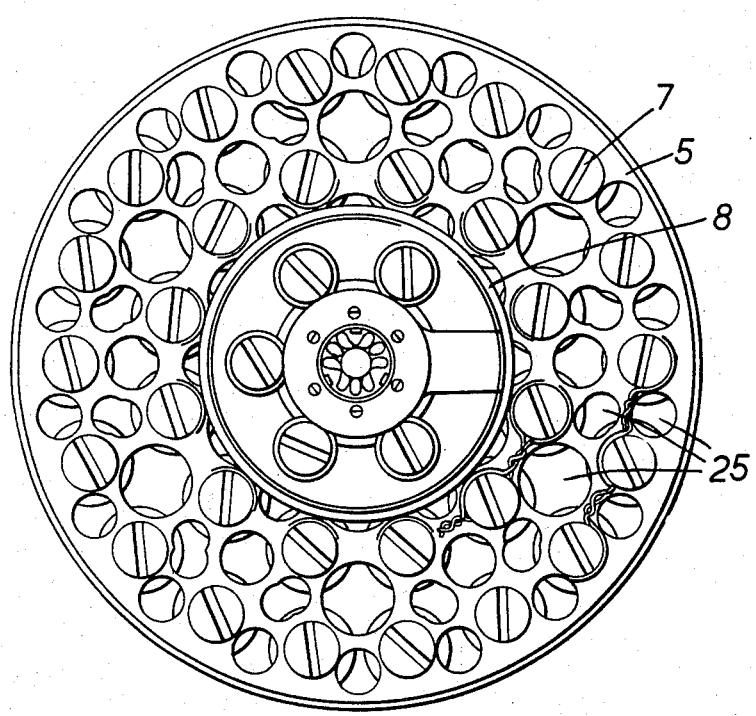
Figure 4:
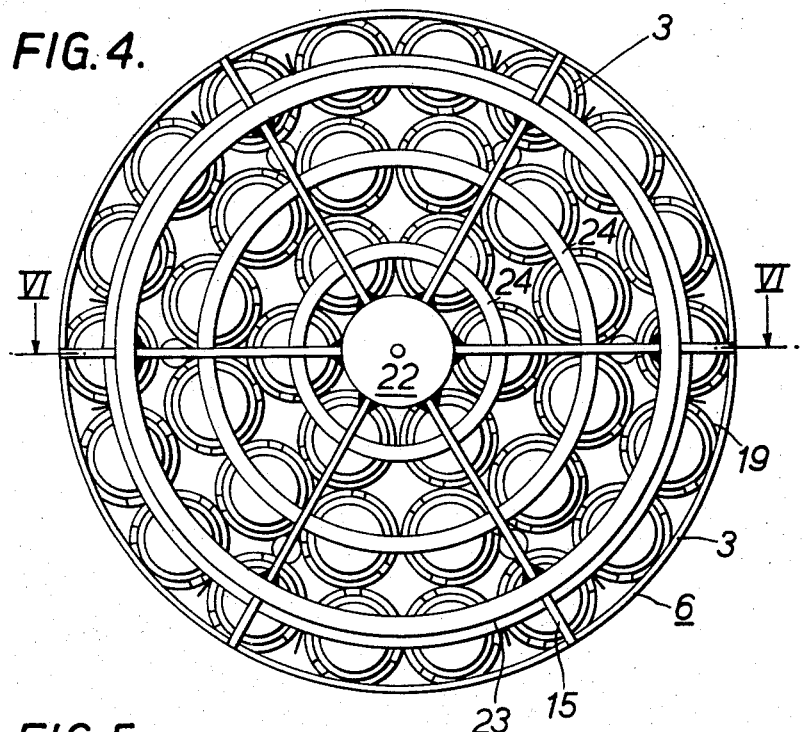
Figure 5:
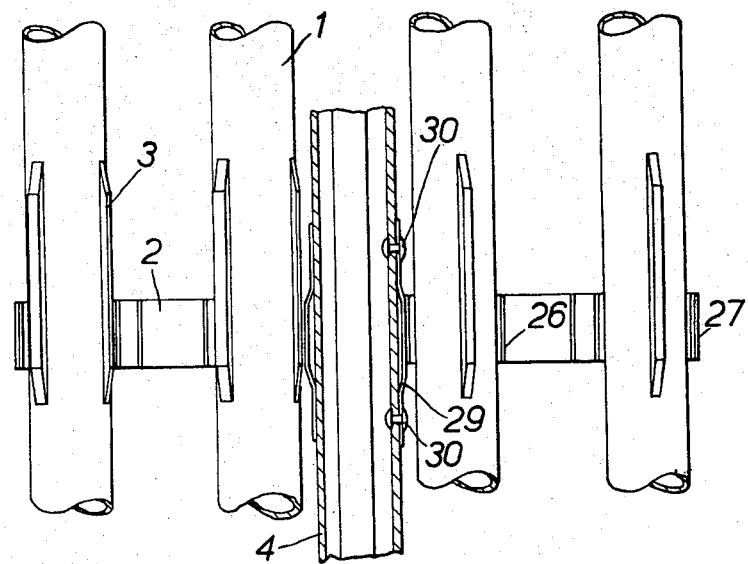

Constructions of rod cluster fuel assemblies will now be described, by way of example, with reference to the accompanying drawings wherein:

FIGURE 1 is a fragmentary side view of a rod cluster fuel assembly partly in section, FIGURE 2 is a plan view in section on line II—II of FIGURE 1, FIGURE 3 is a plan view, FIGURE 4 is a view in the direction of the arrow designated IV in FIGURE 1, FIGURE 5 is a fragmentary view in section on line V—V of FIGURE 2, and FIGURE 6 is a fragmentary side view in section on line VI—VI of FIGURE 4.

In the construction of rod cluster fuel assembly shown in the drawings the fuel rods 1 are braced intermediate the ends of the cluster by transverse bracing grids 2 (only one being shown in FIGURE 1) and the assembly is characterised in that each fuel rod has spaced groups of four spaced elongate projections hereinafter referred to as wear pads 3 on its outer surface. The projections are of elongate form arranged with their longitudinal axes parallel to the longitudinal axes of the fuel rods. The groups of projections coincide with the transverse bracing grids and are arranged so that the wear pads serve to space the fuel rods from the grids.

In greater detail, the rod cluster fuel assembly shown in the drawings has thirty six fuel rods 2 arranged on three concentric pitch circles about a central tube 4 having side apertures (not shown). The fuel rods are end supported by a plate 5 and a grid 6, the rods being secured to the plate 5 by bolts 7 as shown in FIGURE 1 and being slidably guided by cells in the grid 6 so as to compensate for thermal expansion of the rods. The fuel rods are spaced by eleven bracing grids 2 disposed along the length of the cluster at 12½" intervals. The assembly is adapted by a screw thread connection 8 to be attached to a supporting member (not shown) by which the assembly can be suspended within a fuel element channel of a nuclear reactor core.

The fuel rods are 12 feet 9¼" long and ⅝" outside diameter and each comprises a zirconium alloy (Zirconium–2) tube 9 containing a stack of pellets 10 of uranium dioxide enriched in the isotope U235. The stack of pellets is consolidated by a compression spring 11 disposed within a void 12 at the end of the rod adjacent the plate 5. The wear pads 3 are metal pads of zirconium alloy.

The grid 6 comprises an annular member 13 attached to a central tubular member 14 by six webs 15. The member 13 has a spigot 16 which is embraced by the outer rim of a cell defining member 17; the member 17 is secured to the spigot by spot welds 18 as shown in FIGURE 1. The cell defining member 17 is made from stainless steel strip and has thirty six ferrules 19 arranged to be penetrated by the fuel rods 1. The fuel rods slide within the ferrules 19, the tube 9 being spaced from the ferrules by wear pads 3. The tubular member 14 embraces an end of the central tube 4 of the assembly and is secured thereto by a pin 20. A blind end 21 of the tubular member 14 has a tapered spike 22 and a part spherical rim 23 bounds the webs 15. Three concentric wire rings 24 have diameters equal to the pitch circles of the rods and are supported by the edges of the webs 15. The plate 5 to which the fuel rods are secured has apertures 25 as shown in FIGURE 3.

The transverse bracing grids 2, one of which is shown in FIGURE 2, are fabricated from stainless steel strip and each comprises thirty six ferrules 26 contained within a peripheral rim 27. The ferrules have internal diameter .700" and are arranged in concentric circles coincident with the fuel rods 1. The small split tubular members 28 are provided merely to add rigidity to the structure. The grid has a central ferrule 29 which is threaded on to the central tube 4 of the assembly and is secured thereto by rivets 30 as shown in FIGURE 5.

In use in a nuclear reactor core with the assembly suspended in a vertical fuel element channel, the assembly is immersed in water coolant which flows upwardly through the channel and is heated by contact with the fuel rods to generate steam. Coolant flow is through the grid 6 and along the cluster, through the transverse bracing grids 2 and thence through the apertures 25 in the plate 5. The rim 23 of the grid 6 serves to locate the lower end of the assembly in a vertically disposed fuel element channel of a reactor core by engaging a stabilising tube.

In the event of fracture of a fuel rod during operation of a nuclear reactor core, the wire rings serve to prevent free fall of fragmentary fuel rod through the grid 6 into the lower end of a fuel element channel of the reactor. The supporting member (not shown) to which the assembly is attached by screw thread connection 8 is connectable to an emergency water supply so that in the event of an emergency such as would be caused by breach of the coolant circuit resulting in loss of coolant in the fuel element channels, emergency water is conducted to the cluster of fuel rods via the supporting member, the central tube 4 of the cluster and thence to spray from the side apertures of the central tube on to the fuel rods.

The wear pads are attached to the tubes 9 of the fuel rods by brazing using zirconium-beryllium alloy as braze material.

In an alternative construction of rod cluster fuel assembly the wear pads are attached by resistance welding and in a third construction are attached by electron beam welding. In electron beam welding of the wear pads, the beam is directed tangentially to the tube 9 and is traversed longitudinally along the abutting faces of each pad and the tube.

After attachment of the wear pads 3 to the tubes 9, the groups of pads are machined to a diameter which will provide a free sliding fit with the ferrules 19, 24, so that the fuel rods in the finished assembly are guided within the grids 6 and 2 and any corrosion, wear, abrasion or indentation caused by the coolant flow is generally limited to the wear pads and the grids and the integrity of the tubes 9 is preserved substantially throughout the in-core life of the rod cluster fuel assembly.

A fourth construction of rod cluster fuel assembly utilises fuel rods having sheaths (for containing the fuel pellets) produced from zircalloy tubes which have increased wall thickness at intervals along their length produced by rotary swaging. The projections or wear pads are produced by machining the sections of increased wall thickness and are thus integral with the sheath.

We claim:

1. A nuclear reactor fuel element assembly comprising:
   a cluster of spaced elongate parallel sheathed fuel rods;
   an end support for said rods in said cluster;
   at least one transverse bracing grid disposed intermediate the ends of said fuel rods for spacing said fuel rods;
   and a group of spaced solid projections forming wear pads on the outer surface of each of the fuel rods, said projections being of elongate form arranged with their longitudinal axes parallel with the longitudinal axes of the fuel elements, said group of projections coinciding with said transverse bracing grid and adapted slidably to engage with and to space the fuel rods from said grid.

2. A nuclear reactor fuel element assembly according to claim 1 wherein said projections are attached to the outer surface of each of the fuel rod sheaths.

3. A nuclear reactor fuel element assembly according to claim 1 wherein said projections are integrally formed from the sheaths of the fuel elements.

References Cited

UNITED STATES PATENTS

| | | | |
|---|---|---|---|
| 2,890,158 | 6/1959 | Ohlinger et al. | 176—81 X |
| 2,902,422 | 9/1959 | Hutter | 176—81 X |
| 2,990,359 | 6/1961 | Wyman | 176—81 |
| 3,030,291 | 4/1962 | Butler et al. | 176—81 |
| 3,182,003 | 5/1965 | Thorp et al. | 176—78 |
| 3,228,854 | 1/1966 | Bekkering et al. | 176—78 |
| 3,255,090 | 6/1966 | Leirvik | 176—76 |
| 3,324,008 | 6/1967 | Howieson et al. | 176—76 X |

FOREIGN PATENTS

| | | |
|---|---|---|
| 1,324,796 | 3/1963 | France. |
| 914,351 | 1/1963 | Great Britain. |

CARL D. QUARFORTH, *Primary Examiner.*

BENJAMIN R. PADGETT, *Examiner.*

M. J. SCOLNICK, *Assistant Examiner.*